United States Patent [19]

Taylor

[11] 3,724,695
[45] Apr. 3, 1973

[54] SELF-CONTAINED GOOSENECK DUMPING TRAILER

[76] Inventor: Robert S. Taylor, 2526 Cartwright, Dallas, Tex.

[22] Filed: Apr. 21, 1971

[21] Appl. No.: 135,936

[52] U.S. Cl. ............ 214/505, 214/517, 280/423 R, 298/22 R
[51] Int. Cl. ............................................. B60p 1/28
[58] Field of Search ............ 214/505, 506, 515, 517; 280/423 R, 423 B, 425 A; 298/22 R

[56] References Cited

UNITED STATES PATENTS

| | | | |
|---|---|---|---|
| 3,071,264 | 1/1963 | Totaro et al. | 214/515 X |
| 3,406,852 | 10/1968 | Winckler | 214/506 |
| 3,034,674 | 5/1962 | Bertoglio et al. | 214/517 |
| 3,462,033 | 8/1969 | Pioch | 214/505 |
| 3,288,315 | 11/1966 | Bigden | 214/506 |

Primary Examiner—Albert J. Makay
Attorney—Richards, Harris & Hubbard

[57] ABSTRACT

A trailer includes a frame, wheel assemblies for supporting the frame on a surface, a gooseneck assembly mounted at the front of the frame, and a bed pivotally attached to the rear of the frame. Part of the bed extends rearwardly beyond the rear of the frame, and hydraulic cylinders are provided for pivoting the bed between a horizontal position and an inclined position in which the rear of the bed engages the surface. A hydraulic winch is mounted on the frame and a cable extends from the winch first rearwardly to a pulley mounted at the rear of the frame, then forwardly to a pulley mounted at the front of the bed and finally rearwardly along the top of the bed. An engine and a hydraulic pump are mounted within the gooseneck assembly and function to supply pressurized hydraulic fluid for operating the cylinders and the winch.

9 Claims, 3 Drawing Figures

INVENTOR
ROBERT S. TAYLOR

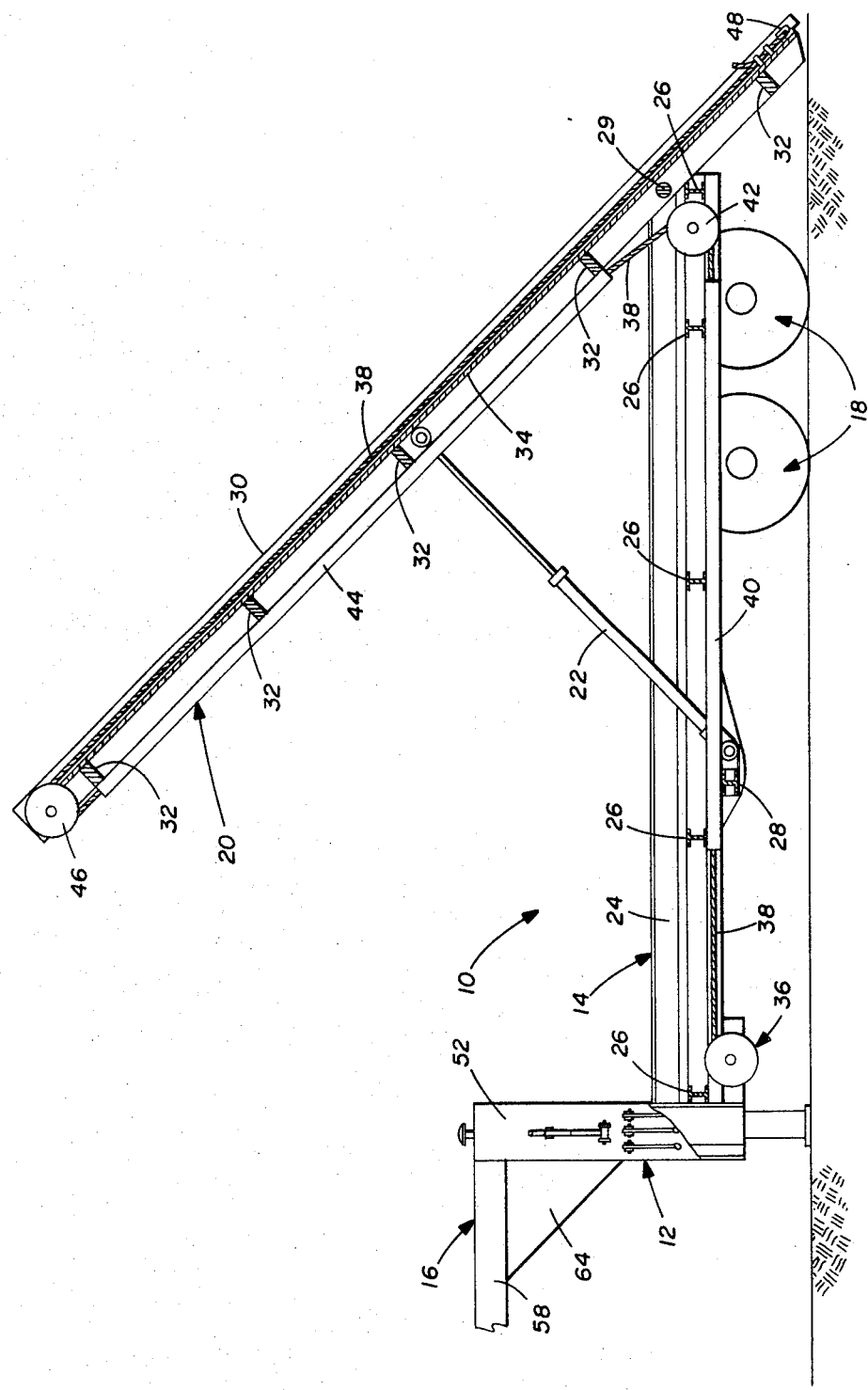

SELF-CONTAINED GOOSENECK DUMPING TRAILER

BACKGROUND AND SUMMARY OF THE INVENTION

This invention relates to a self-contained gooseneck dumping trailer, and more particularly to a self-loading dumping trailer adapted for transportation by relatively light duty vehicles, such as pickup trucks and the like.

Recently, considerable research activity has been directed toward refuse removal systems. Many of the systems that have resulted from this effort involve containers which are situated at such locations as apartment houses, retail stores, construction sites, etc. for filling by persons living or working nearby. The containers are periodically emptied by vehicles that transport the containers from their respective locations to a refuse disposal site.

Heretofore, most vehicles capable of transporting and emptying refuse containers have been adapted for that function only. Such specialization is very beneficial in situations involving a sufficient number of refuse containers to occupy the services of a vehicle substantially full time. On the other hand, in situations involving only a limited number of refuse containers it is desirable that a vehicle be capable of performing tasks in addition to transporting and emptying refuse containers.

The present invention comprises a self-contained gooseneck dumping trailer which is especially designed to transport and empty refuse containers but which is also adapted to load, transport and unload such diverse items as LPG tanks, wrecked automobiles, animal carcasses, etc. In accordance with the preferred embodiment of the invention, a gooseneck trailer includes a bed supported for movement to an inclined orientation in which the rear of the bed is positioned to receive articles. A cable extends rearwardly along the top of the bed and is operable by a winch to draw articles onto the inclined bed. Thereafter, the bed is returned to a horizontal orientation, and the trailer is pulled by a pickup truck or the like to transport articles on the bed. Preferably, operating power for tilting the bed and for driving the winch is supplied by an engine mounted within the gooseneck portion of the trailer.

DESCRIPTION OF THE DRAWINGS

A more complete understanding of the present invention may be had by referring to the following detailed description when taken in conjunction with the accompanying drawings, wherein:

FIG. 3 is a sectional view of the trailer shown in FIG. 1 in which certain of the component parts of the trailer are illustrated schematically.

DETAILED DESCRIPTION

Figure 1:
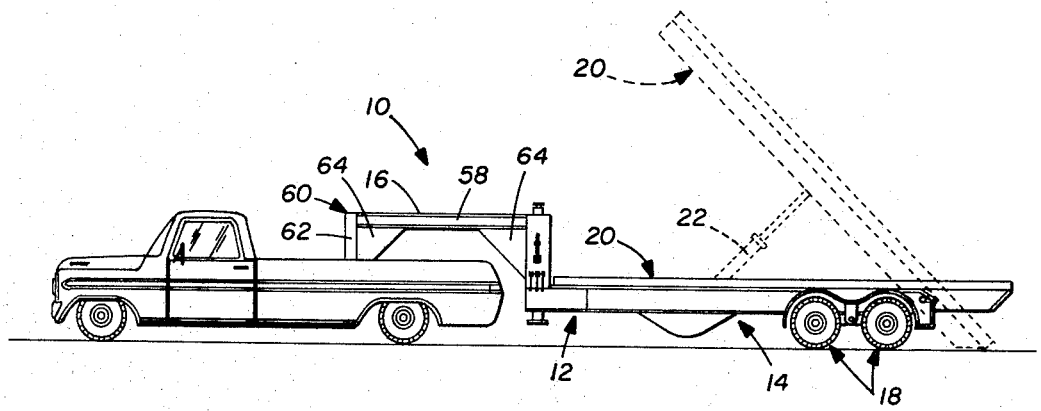
FIG. 1 is a sideview of a self-contained gooseneck dumping trailer incorporating the invention.

Referring now to the drawings, and particularly to FIG. 1 thereof, there is shown a self-contained gooseneck dumping trailer 10 incorporating the present invention. The trailer 10 includes a frame 12 comprising a horizontal portion 14 and a gooseneck portion 16. The horizontal portion 14 of the frame 12 is supported on a pair of conventional wheel and axle assemblies 18. The gooseneck portion 16 of the frame 12 is connected to the front of the horizontal portion 14 and is adapted for connection to a light duty vehicle, such as a pickup truck. The trailer 10 further includes a bed 20 which is supported on the frame 12 for pivotal movement between the positions shown in full line and in dashed lines in FIG. 1 under the action of a pair of hydraulic cylinders 22.

Referring now to FIG. 3, the horizontal portion 14 of the frame 12 of the trailer 10 comprises a pair of rigid side beams 24 which extend longitudinally of the trailer 10 and a plurality of beams 26 which extend transversely of the trailer 10 between the beams 24. A beam 28 also extends transversely between the beams 24, but is located beneath the beams 26, and serves to support the hydraulic cylinders 22.

The bed 20 is pivotally supported at the rear of the horizontal portion 14 of the frame 12 by a pair of pivot pins 29. The bed 20 comprises a pair of rigid side beams 30 and a plurality of beams 32 which extend transversely between the side beams 30. An imperforate article receiving and supporting plate 34 is supported on the beams 32 of the bed 20 and extends the entire length and width of the bed 20. In accordance with the preferred embodiment of the invention, the plate 34 of the bed 20 extends substantially rearwardly from the rear of the horizontal portion 14 of the frame 12, and therefore engages the surface which supports the trailer 10 when the bed 20 is in the inclined position shown in FIG. 3.

A hydraulic winch 36 is supported on the frame 12 at the front of the horizontal portion 14. A cable 38 extends rearwardly from the winch 36 through a guide tube 40 supported on the beams 26. The cable 38 then passes around a pulley 42 which is pivotally supported on the frame 12 at the rear of the horizontal portion 14. From the pulley 42, the cable 38 passes through a guide tube 44 supported on the beams 32 of the bed 20, and then around a pulley 46 which is pivotally supported at the front of the bed 20. From the pulley 46, the cable 38 passes rearwardly along the top surface of the plate 34 and terminates in a conventional hook 48. Thus, it will be appreciated that the hydraulic winch 36 is operable through the cable 38 to move the hook 48 either forwardly or rearwardly relative to the bed 20 of the trailer 10.

Figure 2:
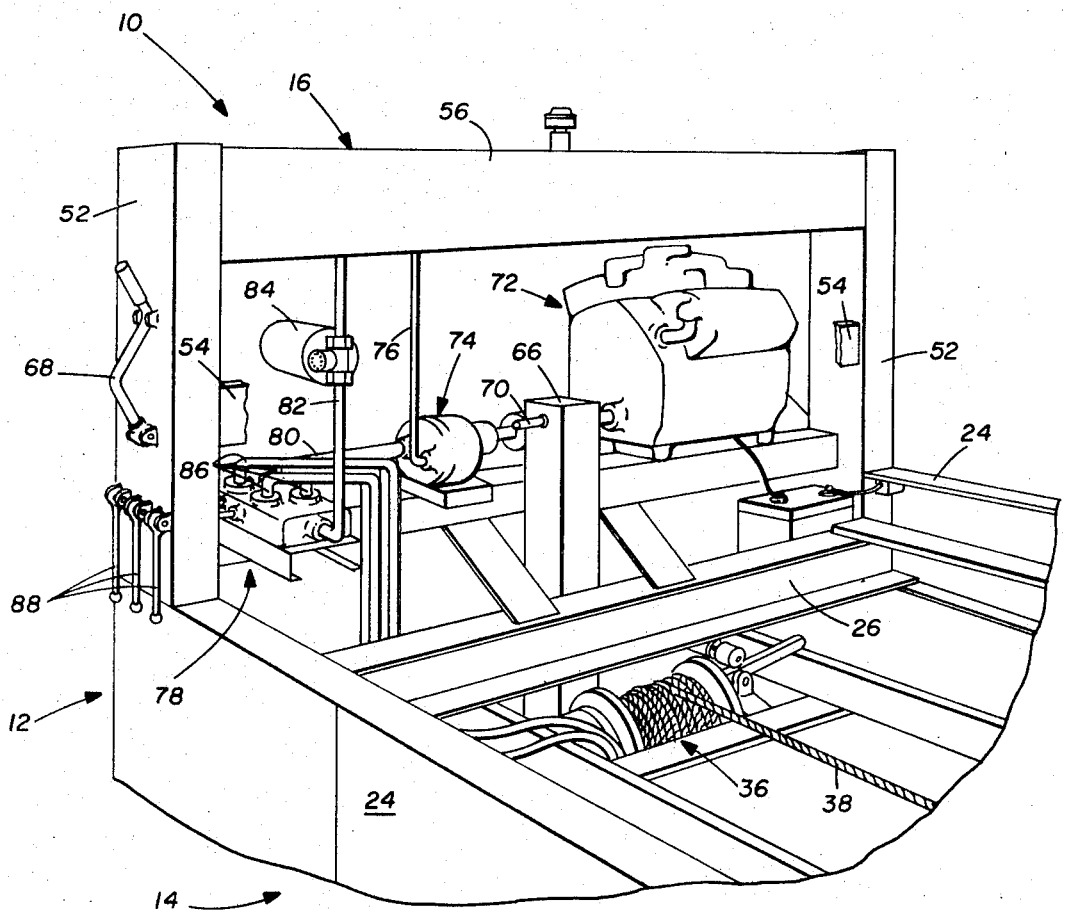
FIG. 2 is a perspective view of a portion of the trailer shown in FIG. 1.

As is best shown in FIGS. 1 and 2, the horizontal portion 14 of the frame 12 of the trailer 10 further includes a front beam 50 which extends transversely of the trailer 10 between the front ends of the side beams 24. The gooseneck portion 16 of the frame 12 includes a pair of beams 52 which extend upwardly from the side beams 24 at points aligned with the front beam 50. A pair of beams 54 and 56 extend transversely between the beams 52, and a pair of beams 58 extend forwardly and inwardly from the upper ends of the beams 52 to an intersection 60 located on the center line of the trailer 10. A member 62 extends downwardly from the intersection 60 for connection to a light duty vehicle such as a pickup truck, or the like. The component parts of the gooseneck portion 16 of the frame 12 are preferably reinforced by a plurality of triangular gussets 64.

Referring now particularly to FIG. 2, a conventional landing gear 66 is mounted on the front beam 50 for supporting the front of the frame 12 of the trailer 10 whenever the trailer 10 is not connected to a vehicle. The landing gear 66 is operated by a crank 68 which is connected to the landing gear 66 through a drive shaft 70. A conventional internal combustion engine 72 is mounted on the front beams 50 and drives a hydraulic pump 74 through a flexible coupling (not shown). The beam 56 of the gooseneck portion 16 of the frame 12 of the trailer 10 comprises the hydraulic fluid reservoir. Thus, upon operation of the internal combustion engine 72, the hydraulic pump 74 functions to withdraw hydraulic fluid from the beam 56 through a pipe 76 and to force pressurized hydraulic fluid to a valve block 78 through a pipe 80. From the valve block 78, the hydraulic fluid is returned to the beam 56 through a pipe 82 and a filter 84.

The valve body comprises a trio of conventional three position, four way hydraulic valves 86, each having an operating handle 88. One of the valves 86 functions to selectively direct pressurized hydraulic fluid from the pump 74 either to the rod ends or to the blind ends of the hydraulic cylinders 22, whereby the bed 20 is manipulated between the positions shown in full line and in dashed lines of FIG. 1. Another of the valves 86 controls the flow of pressurized hydraulic fluid from the pump 74 to the hydraulic winch 36 and thereby functions to selectively extend or retract the hook 48 on the distal of the cable 38 relative to the bed 20. The third valve of the valve body 78 comprises a spare which is available to control the flow of hydraulic fluid from the pump 74 to any hydraulic actuator that may be used in conjunction with the gooseneck dumping trailer 10.

In the use of the gooseneck dumping trailer 10, the rear of the bed 20 of the trailer 10 is positioned adjacent an object to be transported. Then, the engine 72 is started and the valves 86 of the valve body 78 are actuated to raise the bed 20 to the position shown in dashed lines in FIG. 1 and to extend the cable 38. The hook 48 on the distal ends of the cable 38 is then connected to the object, whereupon the cable 38 is retracted so that the object is pulled onto the inclined bed 20. The bed 20 is then returned to the position shown in full lines in FIG. 1, the engine 72 is stopped, and the object is transported on the trailer by operation of a light duty vehicle connected to the gooseneck portion 16 of the frame 12. When the destination of the object has been reached, the foregoing steps are carried out in reverse order to unload the object from the gooseneck dumping trailer 10.

Because the plate 34 of the bed 20 is solid throughout its length and width, the gooseneck dumping trailer 10 is adapted for the transportation of a wide variety of articles. For example, the trailer 10 can be employed to load and transport such diverse items as wrecked automobiles, animal carcasses, and other heavy, bulky items. However, the gooseneck dumping trailer is particularly adapted for the loading, transporting, and dumping of refuse containers of the type employed at such locations as construction sites, apartment houses, retail stores and the like. Such a refuse container may be adapted for use with gooseneck dumping trailers incorporating the present invention by mounting at least one roller at one end of the container and providing a normally closed dumping gate at the other end of the container. Then, either when the container is full or at scheduled intervals, the gooseneck dumping trailer 10 is maneuvered to position the rear of the bed 20 adjacent the end of the container having the rollers. Thereafter, the bed 20 is elevated and the hook 48 of the cable 38 is connected to the container. Then, the winch 36 is operated to pull the container onto the bed 20, after which the bed 20 is lowered to the position shown in full lines in FIG. 1.

The gooseneck dumping trailer 10 is then transported to a dumping site by a light duty vehicle, whereupon the dumping gate of the container is opened and the bed 20 of the trailer 10 is pivoted to the position shown in dashed lines in FIG. 1. This permits refuse within the container to spill outwardly therefrom in the manner of a conventional dumptruck. When the container is empty, the bed 20 of the trailer 10 is pivoted to the position shown in full lines in FIG. 1, after which the dumping gate of the container is closed. The trailer 10 is then employed to transport the container either to the same or to another refuse disposal site, whereupon the bed 20 is pivoted to the position shown in dashed lines in FIG. 1 and the winch 36 is operated to unload the container from the bed 20 by extending the cable 38. Finally, the hook 48 is disconnected from the container, whereupon the container is ready to receive refuse.

From the foregoing, it will be understood that the present invention comprises a self-contained gooseneck dumping trailer which is economically manufactured from easily fabricated parts and which is simple and straightforward in operation. Trailers incorporating the invention are adapted for transportation by light duty vehicles and are especially useful in loading, transporting, dumping, and unloading refuse containers. Other heavy and/or bulky items are also conveniently loaded, transported, and unloaded by means of self-contained gooseneck dumping trailers incorporating the invention.

Although the preferred embodiment of the invention has been illustrated in the Drawing and described in the foregoing specification, it will be understood that the invention is not limited to the embodiment disclosed, but is capable of rearrangement, modification, and substitution of parts and elements without departing from the spirit of the invention.

What is claimed is:

1. A self-contained gooseneck dumping trailer comprising:
   a frame including a horizontally extending rear portion and a gooseneck front portion for attaching the trailer to a towing vehicle;
   said gooseneck portion of the frame comprising a pair of beams which extend vertically upwardly from the front end of the horizontally extending rear portion of the frame, a pair of beams which extend horizontally inwardly from the upper ends of the vertically extending beams to an intersection, and a member extending downwardly from the intersection of the horizontally extending beams for connection to a towing vehicle;
   wheel means for supporting the rear portion of the frame on a surface;

a bed pivotally supported at the rear of the rear portion of the frame for rotation about a horizontal axis, said bed including a portion extending a substantial distance rearwardly from said axis;

a hydraulic actuator connected between the frame and the bed for pivoting the bed between a horizontal position and an inclined position in which the rear of the bed engages the surface;

a hydraulic winch mounted on the frame;

a cable connected to the winch and extending therefrom along the top of the bed for actuation by the winch to draw objects onto the bed when the bed is in the inclined position;

a source of pressurized hydraulic fluid mounted on the front end of the horizontally extending rear portion of the frame and between the vertically extending beams of the gooseneck front portion thereof, said source comprising an internal combustion engine and a hydraulic pump driven thereby; and valve means for selectively directing pressurized hydraulic fluid from the source to the hydraulic motor and to the hydraulic winch.

2. The self-contained gooseneck dumping trailer according to claim 1 further characterized by a first guide tube mounted on the frame and extending from the winch to the rear end of the frame, a first pulley mounted at the rear end of the frame, a second guide tube mounted on the underside of the bed and extending from the first pulley to the front end of the bed, and a second pulley mounted at the front end of the bed, and wherein the cable extends from the winch through the first guide tube around the first pulley through the second guide tube around the second pulley and along the top of the bed.

3. The self-contained gooseneck dumping trailer according to claim 1 further including a beam extending horizontally between the upper ends of the vertically extending beams of the gooseneck front portion of the frame, said horizontally extending beam comprising a hydraulic fluid reservoir.

4. The self-contained gooseneck dumping trailer according to claim 1 wherein the bed includes a portion extending forwardly from the axis and having a length substantially equal to the length of the horizontally extending rear portion of the frame, and wherein the bed is imperforate throughout its length and width.

5. A self-contained gooseneck dumping trailer comprising:

a horizontal frame having front and rear ends;

wheel means for supporting the rear end of the frame;

a bed having front and rear ends;

means interconnecting the rear end of the frame and a point substantially forward of the rear end of the bed for pivotally supporting the bed on the frame;

a hydraulic cylinder connected between the frame and the bed for selective actuation to pivot the bed about a horizontal axis;

a hydraulic winch mounted on the frame adjacent the front end thereof;

a first pulley rotatably supported at the rear end of the frame;

a second pulley rotatably supported at the front end of the bed;

a cable extending rearwardly from the winch and around the first pulley, and then forwardly around the second pulley, and finally rearwardly along the top of the bed;

a first guide tube mounted on the frame and extending between the winch and the first pulley for guiding the cable therebetween;

a second guide tube mounted on the bed and extending between the first pulley and the second pulley for guiding the cable therebetween;

a pair of beams fixed to the front end of the frame and extending upwardly from the opposite corners thereof;

a pair of beams fixed to the upper ends of the upwardly extending beams and extending forwardly and inwardly therefrom to an intersection;

a member extending downwardly from the intersection of the forwardly and inwardly extending beams for connection to a towing vehicle;

an internal combustion engine mounted on the front end of the frame between the upwardly extending beams and beneath the forwardly and inwardly extending beams;

a hydraulic pump mounted on the front end of the frame between the upwardly extending beams and connected to the engine for operation thereby; and a pair of valves for selective actuation to direct hydraulic fluid from the pump to the hydraulic winch and to the hydraulic cylinder.

6. The self-contained gooseneck dumping trailer according to claim 5 wherein the bed is substantially flat and imperforate throughout its length and width.

7. The self-contained gooseneck dumping trailer according to claim 5 wherein the hydraulic cylinder pivots the bed relative to the frame between a first position wherein the bed extends substantially horizontally and a second position wherein the bed extends angularly relative to the frame and wherein the rear end of the bed is positioned substantially beneath the rear end of the frame.

8. The self-contained gooseneck dumping trailer according to claim 5 wherein the wheel means supports the trailer on a surface, wherein the hydraulic cylinder is operable to tilt the bed relative to the frame until the rear end of the bed is positioned substantially in alignment with the surface, and wherein the hydraulic winch is thereafter operable to retract the cable and thereby draw objects onto the bed.

9. The self-contained gooseneck dumping trailer according to claim 5 further including a beam extending between the upper ends of the upwardly extending beams and comprising a hydraulic fluid reservoir.

* * * * *